United States Patent [19]

Laing

[11] 4,015,583
[45] Apr. 5, 1977

[54] DEVICE FOR RECEIVING OR EMITTING RADIATION ENERGY

[76] Inventor: Nikolaus Laing, Hofener Weg 35-37, 7141 Aldingen near Stuttgart, Germany

[22] Filed: May 6, 1975

[21] Appl. No.: 574,881

Related U.S. Application Data

[63] Continuation-in-part of Ser. No. 370,839, June 18, 1973, abandoned.

[30] Foreign Application Priority Data

June 23, 1972 Austria ............................... 5406/72

[52] U.S. Cl. ............................... 126/270; 126/271; 4/172.12
[51] Int. Cl.² .......................................... F24J 3/02
[58] Field of Search .......... 4/172.12; 126/270, 271; 237/1 A; 250/103

[56] References Cited

UNITED STATES PATENTS

| | | |
|---|---|---|
| 3,022,781 | 2/1962 | Andrassy ............................ 126/271 |
| 3,072,920 | 1/1963 | Yellott ............................... 4/172.12 |
| 3,076,450 | 2/1963 | Gough et al. ...................... 126/271 |
| 3,114,840 | 12/1963 | Johnston ............................ 250/103 |
| 3,174,915 | 3/1965 | Edlin ................................. 126/271 |
| 3,236,294 | 2/1966 | Thomason ......................... 126/271 |
| 3,249,682 | 5/1966 | Laing .............................. 126/270 X |

FOREIGN PATENTS OR APPLICATIONS 994,106 8/1951 France ............................. 126/271

*Primary Examiner*—Kenneth W. Sprague
*Attorney, Agent, or Firm*—Pennie & Edmonds

[57] ABSTRACT

An energy transmission device through which energy may pass where the device has an optically active layer for absorbing or reflecting solar energy overlaid by a plurality of parallel extending U-shaped channels where the width of the channels is less than the height to prevent convection currents over the layer.

4 Claims, 5 Drawing Figures

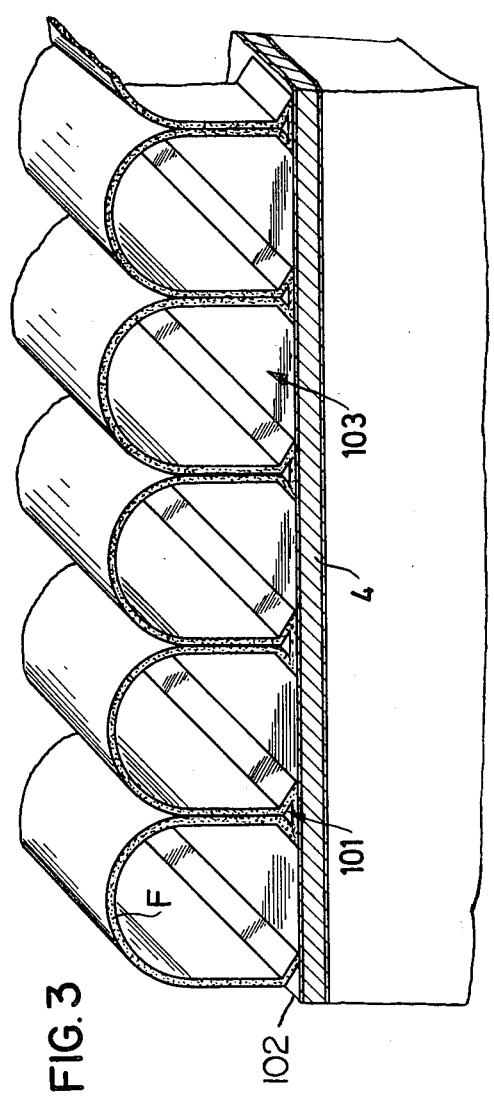

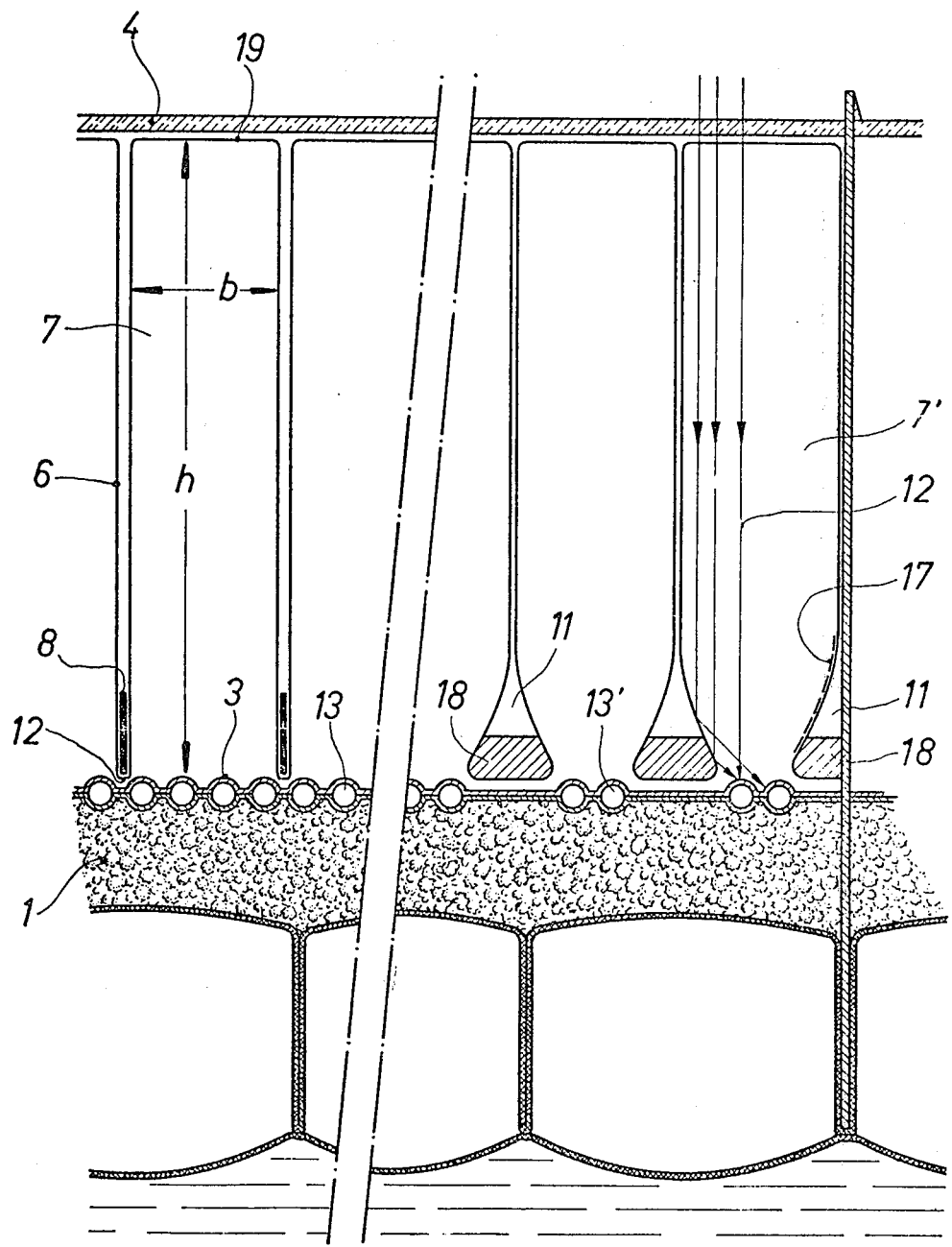

DEVICE FOR RECEIVING OR EMITTING RADIATION ENERGY

CROSS-REFERENCE TO OTHER APPLICATIONS

This application is a Continuation-in-Part of my copending application Ser. No. 370,839 filed June 18, 1973, now abandoned.

BACKGROUND OF THE INVENTION

An important consideration for regulating passage of solar energy through a device is in the optical property of a surface of the device facing the sunlight. In devices which are to be utilized to absorb solar energy, extraordinary large proportions of solar energy flow determined by the solar constants may be harnessed as useful energy where the surface facing the sun utilizes layers which absorb the energy over the frequency range of the sunlight while reflecting little or only a small amount of energy in the long-wave infra-red region. In a vacuum the proportion of incidence to reflected radiation determines the amount of useable energy derived from the sunlight. In solar heaters as used in conventional installations which are not in a vacuum, an important perameter is the convection current of ambient air contacting the device. When the air is still, roofs on which the devices are installed may reach temperatures of 100° or more which creates considerable convection currents. The convection currents also exist under low wind velocity conditions whereby the device is deprived of absorbing a substantial portion of the solar energy to which it is subjected. At higher wind velocity conditions, the use of such a device becomes questionable. The detrimental effects of the convection currents also apply in situations where the device is used to emit the energy and reflect solar energy and whereby heat is given off to the ambient air.

Prior art devices, for example as shown in U.S. Pat. No. 3,072,920, have proposed use of optically active layers which face the sun and are separated from ambient air by an air space. The air space in such devices however is of such size and dimension that convection currents within the space may occur thus decreasing the amount of solar energy which may be absorbed when the device is used as a sun collector or decreasing the amount of energy which may be radiated when the device is used to radiate heat to ambient air. It is therefore a purpose of my invention to provide for a solar conditioning device of simplified construction which may readily absorb solar energy or radiate thermal energy and which includes means to prevent convection flow of air over an optically active surface facing the sun.

GENERAL DESCRIPTION OF THE INVENTION

Broadly, the invention reduces convection flow over the optically active layer of energy transmission devices by providing a plurality of parallel extending U-shaped channels on the optically active layer in which the width of the channels is less than the height in order to reduce convection currents within the ducts over the layer. The optically active layers preferably have on their surface heat absorbing or emitting tubes arranged in a grid formation.

The tubes are made of material which has desirable optical characteristics. A first requirement for the material is resistance to ultra-violet radiation such that the tubes will not be destroyed by sunlight. A second requirement for the material of the tubes when the tubes are used as sun collectors is that the tubes should possess significant resistance to temperature. In the case where the devices are used for cooling purposes, that is to radiate heat into the ambient air, the main requirement for the tube material is that the spectral profile of the material be such that long-wave radiation can penetrate unimpeded. The material must be as highly optically permeable in the infra-red region as possible. In devices utilized to absorb the sun's energy, a high degree of reflection in infra-red regions should be provided on the side of the optically active layer facing away from the sun in order that loss of radiation in the infra-red region should be re-reflected towards the roof of the building on which the devices may be mounted.

Examples of materials which can be made into thin films to form thin wall tubes and which further have the required radiation permeability are polyethylenes, polypropylenes and silicon rubbers.

BRIEF DESCRIPTION OF THE DRAWINGS

FIG. 3 is a perspective sectional view of a first embodiment of a device constructed according to the invention;

FIG. 4 is a sectional view of a second embodiment of a device constructed according to the invention; and FIG. 5 is a sectional view of a third embodiment of a device constructed according to the invention.

DETAILED DESCRIPTION OF THE PREFERRED EMBODIMENTS

Figure 1:
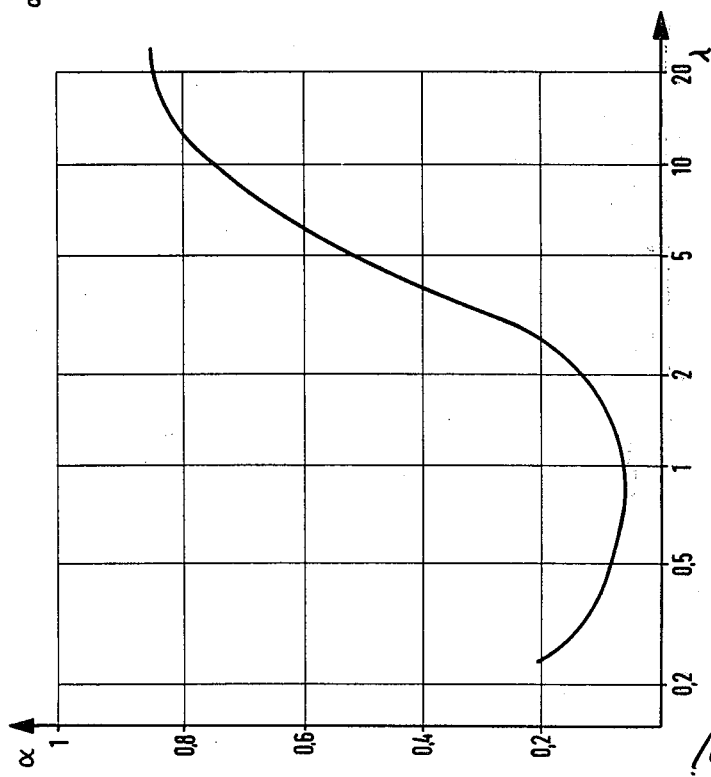
FIG. 1 is a diagram of the absorption curve of a super white layer in accordance with the invention.

Referring to FIG. 1 there is illustrated a spectral profile of a super white optically active layer which comprises a first layer of material which is opaque in the long-wave region but which is permeable to sunlight. The layer may comprise a special glass or sheet of fluoropolyethylene and a second metal layer disposed under the first layer which reflects to a large extent the sun's radiation. In the figure the ordinate comprises the absorption co-efficient and indicates the percentage of solar energy which can be absorbed or emitted compared with that of a physical black body whereas the absissa relates to the wave length of the sunlight or infra-red radiation.

Figure 2:
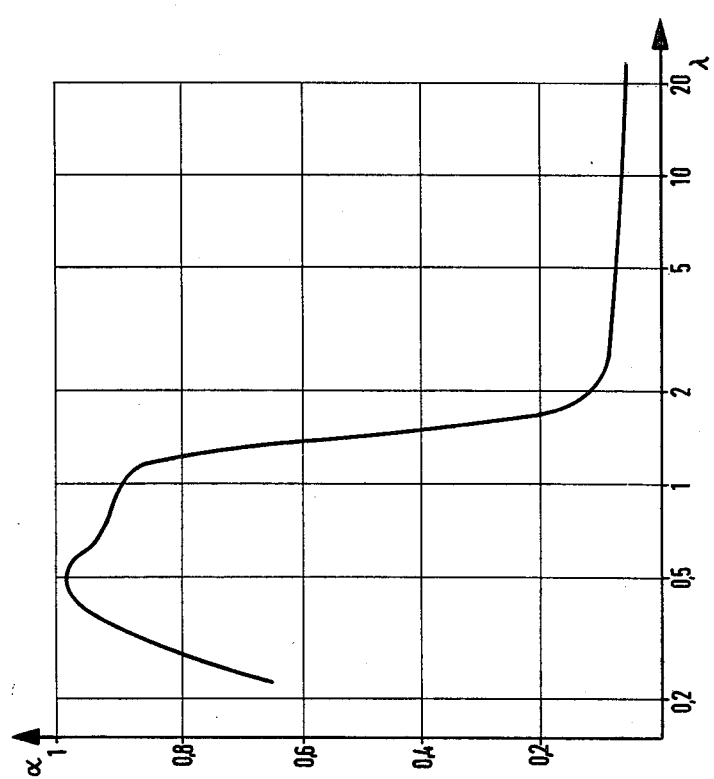
FIG. 2 is a diagram of the absorption curve of the super black layer according to the invention.

FIG. 2 illustrates the spectral profile of a super black layer which may comprise a magnesium fluoride layer, a very thin silicon dioxide layer, a silicon nitride layer and a gold layer.

Referring to FIG. 3 there is illustrated a device constructed according to the invention having an outward facing wall 4 which for the purpose of preventing cooling by ambient air is, according to the invention, covered by optical and radiation permeable sheet F of approximately 0.5 mm. thickness which forms a plurality of channels or ducts 103. The film preferably is made of a polyethylene, polypropylene or a silicon rubber material. The sheet F is deformed to the profile illustrated and joined to the optically active layer 102 along the strips 101 by heat sealing. The air enclosed in the ducts 103 acts as an insulator so that no adverse effect is produced by convection of ambient air across the surface of the optically active layer 102. As shown, legs of portions of adjacent ducts abut each other and extend perpendicularly to the layer 102 to which they are joined. In this form of the invention, the legs are joined to the layer 102 at an acute angle with the strip portion 101 in turn being heat sealed to the layer 102. The width of the ducts is less than the height so as to reduce any convection currents within the ducts themselves. Preferably the device is so arranged that the ducts 102 when placed in use will extend in a substantially east-west direction to further enchance the direction of solar rays contacting the device and further expanding its heat absorption efficiency.

Referring to FIG. 4 a further embodiment of the invention is illustrated in which the optically active layer 3 acts as a heat absorption layer where the layer rests on a further layer of foam material supported by hollow floating bodies 20. The layer 3 has a super black surface which forms a plurality of ducts 13 through which a liquid heat carrier may flow to dissipate the heat absorbed by the layer 3.

Channels 7 are formed on top of the heat absorption layer by a thin film F' which is folded in the region 12 such that the walls 6 of the channels are formed by two wall portions each. In order to make the film walls heavier and to hang in the position shown, a sheet metal strip 8 is positioned in the folded edge. A low air pressure is maintained within the channels so that the film which forms the channels is pressed in the region 19 against a cover plate 4 which is transparent to solar rays. As shown the walls 6 do not contact the optically active layer 3. The film forming the channels may comprise a polyvinylfluoride material which preferably is on the order of 0.01 mm. thickness. The film in this form of the invention is much thinner than that shown in the embodiment of FIG. 3 since the transparent sheet 4 provides a degree of protection for the film against weather elements and pollution. In this form of the invention as well as in all forms, the width $b$ of the channel is less than the height $h$ which reduces any tendency for convection flow of air within the channel itself with the general rule that the smaller $b$ is with respect to $h$, the less opportunity of any convection flow occurring.

The embodiment of the invention illustrated in FIG. 5 has an optically active layer comprising conduits 13' generally similar to that shown in FIG. 4 but with the difference that the positioning of the conduits varies so as to be concentrated in the center area of each of the channels 7'. Instead of strip metal sheets 8 as used in FIG. 4, molded bodies 18 are utilized to make the folds of the film hang in the desired position. As in the FIG. 4 embodiment, air pressure is maintained within the channels to preserve their form. The film walls of FIG. 5 have thin reflective strips in the region 17 which serve to reflect and focus sun rays 12 towards the conduits 13' in order to produce a higher temperature in the heat carrier circulating within the conduits. In this form of the invention as well as that as shown in FIG. 4, the width of the channels is less than the height to reduce convection currents occurring within the channels which would distract from the efficiency of the device whether it is acting as a heat absorption device or as one emitting radiation energy to the ambient air.

The entire device of FIG. 5 preferably would be moveably mounted so that it could be continually turned to assure that the sun rays would continually pass perpendicularly through the cover 4 in the manner shown.

I claim:

1. An energy transmission device through which energy may pass comprising an optically active layer adapted to face the sun and a plurality of parallel extending U-shaped channels having vertically extending legs covering the side of said layer facing the sun wherein said channels are formed by a single sheet of a thin film-like radiation permeable plastic material folded along fold lines to form said U-shaped channels and having a weight means positioned exteriorly of said channels along said fold lines whereby when said channels are pressurized the plastic material will move against said weight means to form an end of a leg of said U-shaped channel, and wherein the width of said U-shaped channels is less than the height thereof to reduce convection currents within the channels.

2. An energy transmission device according to claim 1 wherein said optically active layer has fluid ducts therein extending parallel to said channels and a fluid heat carrier in said ducts.

3. An energy transmission device through which energy may pass comprising an optically active layer adapted to face the sun and a plurality of parallel extending U-shaped channels having vertically extending legs covering the side of said layer facing the sun wherein said channels are formed by a single sheet of thin film-like radiation permeable plastic material folded along fold lines and having foam means positioned exteriorly of said channels along said fold lines where a portion of said foam means extends towards the center of said channel, reflecting means on the side of said sheet opposite the foam means whereby solar energy entering the channel through the closed end of the U-shaped channel is reflected towards the center of said channel onto said optically active layer, and wherein the width of said U-shaped channels is less than the height thereof to reduce convection current within the channels.

4. An energy transmission device according to claim 3 wherein said optically active layer has a plurality of fluid ducts therein extending parallel to said channel and a fluid heat carrier in said ducts.

* * * * *